US006957080B2

(12) United States Patent
Guetre et al.

(10) Patent No.: US 6,957,080 B2
(45) Date of Patent: Oct. 18, 2005

(54) NOTCH FILTERS IN PLANAR INVERTED-F ANTENNAS FOR PLACING A PLURALITY OF ANTENNAS IN CLOSE PROXIMITY

(75) Inventors: Eric Guetre, Delta (CA); Jari Van Wonterghem, New Westminster (CA)

(73) Assignee: NOKIA Corp., Irving, TX (US)

( * ) Notice: Subject to any disclaimer, the term of this patent is extended or adjusted under 35 U.S.C. 154(b) by 353 days.

(21) Appl. No.: 10/117,760

(22) Filed: Apr. 4, 2002

(65) Prior Publication Data

US 2004/0204189 A1 Oct. 14, 2004

(51) Int. Cl.[7] .................................................. H04B 1/38

(52) U.S. Cl. ................ 455/552.1; 455/272; 455/456.1; 343/702

(58) Field of Search ........................... 455/552.1, 553.1, 455/103, 130, 272, 283, 295, 296, 306, 456.1–456.6; 343/702, 725, 700 MS; 342/357.03, 359.09, 375.1, 377.1

(56) References Cited

U.S. PATENT DOCUMENTS

| | | | | | |
|---|---|---|---|---|---|
| 5,610,620 | A | * | 3/1997 | Stites et al. | 343/725 |
| 6,351,236 | B1 | | 2/2002 | Hasler | |
| 6,438,381 | B1 | * | 8/2002 | Arnold et al. | 455/456.5 |
| 6,529,749 | B1 | * | 3/2003 | Hayes et al. | 455/575.7 |
| 6,617,940 | B2 | * | 9/2003 | Stenberg | 333/134 |
| 6,694,150 | B1 | * | 2/2004 | Standke et al. | 455/552.1 |

* cited by examiner

*Primary Examiner*—Lee Nguyen
(74) *Attorney, Agent, or Firm*—Tom Weber; Milan Patel

(57) ABSTRACT

Mobile terminals having a plurality of planar inverted-F antennas placed in close proximity of each other and methods of fabricating and using such mobile terminals are provided. Generally, planar inverted-F antennas, such as dual band CDMA, GPS, and Bluetooth antennas, cannot be placed in close proximity of each other without having interference. Accordingly, notch filters are provided in a dual band CDMA antenna to mitigate the interference and to facilitate isolation between the antennas.

27 Claims, 9 Drawing Sheets

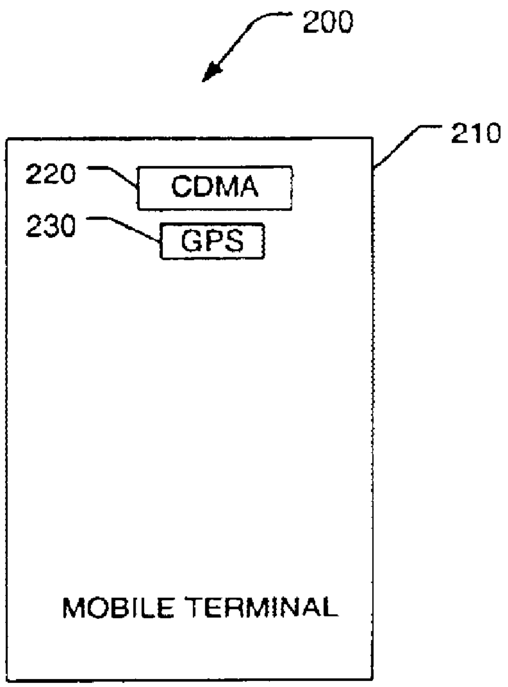
Fig. 2
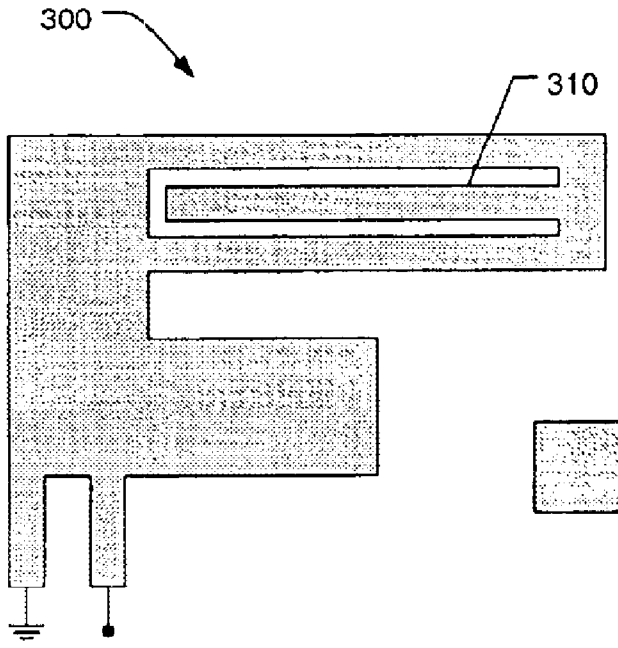
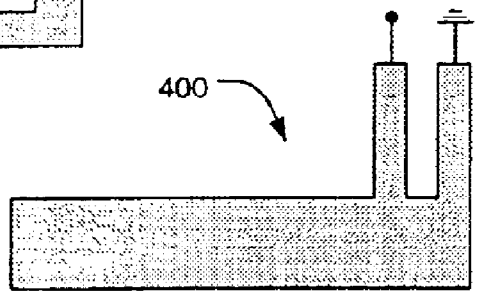
Fig. 4
Fig. 3

NOTCH FILTERS IN PLANAR INVERTED-F ANTENNAS FOR PLACING A PLURALITY OF ANTENNAS IN CLOSE PROXIMITY

TECHNICAL FIELD

The present invention relates to planar inverted-F antennas and, more particularly, to systems and methods for placing dual-band, GPS, and Bluetooth antennas in close proximity.

BACKGROUND OF THE INVENTION

The development and refinement of wireless communication services and devices continues to occur at an extremely rapid pace. One problem associated with wireless communication devices relates to determining a physical location of a device. It can be highly desirable to locate a wireless communication device for a variety of purposes, such as when there is reason to believe that a subscriber associated with the device is experiencing an emergency situation, or when the device has been misplaced. Position location is also desired in applications such as personnel and asset tracking, information services, gas/food/lodging locations services, and entertainment. A solution to such problem must be carefully considered within cost, size, and power consumption limitations of wireless communication systems and devices.

When an individual calls 911, for emergency assistance, the call is typically passed along by a telecommunications carrier to a local Public Safety Answering Point (PSAP), which is responsible for dispatching police, fire and medical services. For a caller from a landline telephone, the PSAP can precisely identify the caller's location and telephone number even if the caller does not know his or her location. However, there is a dilemma when the caller is a wireless telephone user.

Today, wireless subscribers make a significant number of emergency calls. The PSAPs, however, are unable to pinpoint the location of these callers. Many wireless networks do not provide the PSAP with Automatic Number Identification (ANI) or Automatic Location Identification (ALI). Without the caller's ANI and ALI, the PSAPs have no means for re-establishing contact with these callers or identifying the location of the caller. This is important in case the call is cut off and cannot be reestablished by the caller, or for the PSAP to establish the nearest appropriate emergency facility to send. Furthermore, in the United States, the Federal Communications Commission (FCC) is requiring mobile communications operators to detect the position of a cellular telephone calling 911.

However, on a mobile phone or terminal, there is generally one portion of the phone that is desirable for GPS antenna placement. In a talk position, the desirable antenna placement for GPS is in a same area as that of the mobile phone's dual band antenna. A problem is that the close proximity of the GPS antenna to the dual band antenna means that any noise or spur from the dual band antenna, falling in the GPS band, may severely desensitize the GPS receiver. This can lead to non-compliance with the FCC directive, e.g., the inability to acquire and process GPS signals—such is the case even if the GPS and dual band antennas perform well independently.

In addition to position location, mobile phone service providers are building out infrastructure to provide much more than just voice functionality to mobile handsets. Higher data rates and multiple frequency bands for GSM, PCS, 802.11 and Bluetooth are needed to allow interactive game playing, near-real time streaming video, audio downloads of music and even formation of ad-hoc networks with other nearby users or devices. This presents an additional problem of adding another antenna to the mobile phone or terminal.

One solution to the aforementioned problems is to situate the internal antennas at different locations in the mobile phone or terminal. However, in such situation, at least some of the antennas will not be at an optimal location, as they might be covered by the user's hand. Another solution is to switch off a Code Division Multiple Access (CDMA) module's transmitter during Global Positioning System (GPS) operation. However, this is also undesirable, as the modules are not able to function at the same time. Accordingly, an improved system or methodology for antenna configuration is desired.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for mobile terminals having a plurality of planar inverted-F or inverted-F antennas placed in close proximity of each other, such that the plurality of antennas are located within a desired position of the mobile terminal. Generally, close placement of antennas cause interference amongst the respective antennas, thus, desensitizing receivers and degrading performance of different modules. Accordingly, at least one of the antennas of the present invention is provided with a notch filter to mitigate interference and facilitate isolation between the antennas. The present invention has applicability to systems and methodologies associated with mobile terminals and a variety of antennas (e.g., dual band, GPS, Blue Tooth).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 2 illustrates a mobile terminal having a CDMA antenna and a GPS antenna in accordance with an aspect of the present invention.

FIG. 3 illustrates a CDMA antenna in accordance with an aspect of the present invention.

FIG. 4 illustrates a GPS antenna in accordance with an aspect of the present invention.

DETAILED DESCRIPTION OF INVENTION

Figure 1:
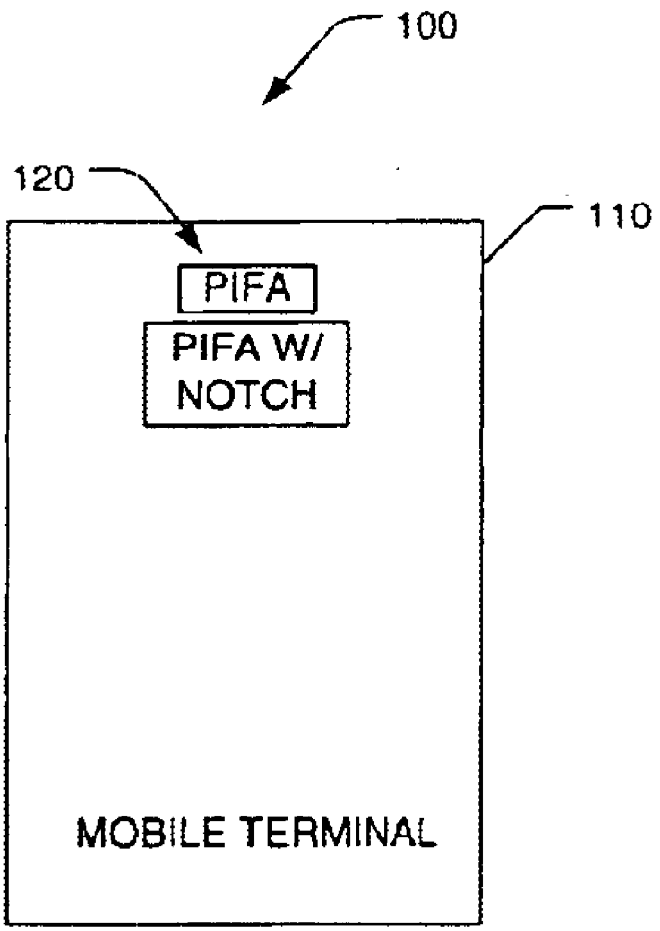
FIG. 1 illustrates a mobile terminal having at least two planar inverted-F antennas in accordance with an aspect of the present invention.

The present invention allows antenna mobile terminal designers to tightly pack inverted-F antennas or planar inverted-F antennas into a small area; and will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

FIG. 1 illustrates a system 100 including a mobile terminal 110 having at least two planar inverted-F antennas (PIFAs) 120 in close proximity. It is to be appreciated that other suitable antennas (e.g., inverted-F antennas (EFAs)) can also be employed in the system 100, and thus, such types of antennas are contemplated as falling within the scope of the hereto appended claims. Generally, on a mobile terminal 110, there is a portion of the mobile terminal 110 that is advantageous for antenna placement. For sake of the following illustration, the mobile terminal 110 can be a mobile telephone, however, it is to be appreciated that the term mobile terminal as employed within this specification and the hereto appended claims is to be construed broadly and cover devices such as for example: base stations, portable computers, inventory devices, personal data assistants (PDAs). . . . The aforementioned portion of the mobile terminal 110 is one that is away from a user's head, and is not covered by the user's hand. To mitigate interference between the IFAs or PIFAs 120, at least one of the antennas 120 includes a notch filter to increase isolation between the antennas 120.

A notch, or band-reject, filter is a highly selective resonant element within a metallic strip of the IFA or PIFA. The notch filter is designed to attenuate a narrow band of frequencies while allowing other frequencies to pass through with only slight loss. Energy at a resonant frequency of the notch filter "sees" the filter as a trap and is coupled to, and dissipated in the filter. Maximum attenuation occurs at the resonant frequency of the filter while other frequencies are attenuated to a lesser degree respectively, depending on distance from the resonant frequency. The notch filter provides a given amount of attenuation at resonance regardless of separation between "pass" and "reject" frequencies. The filter can be tuned so that the narrow band of rejected frequencies can be several MHz from a desired pass frequency or quite close. Notch filters can be added in series to obtain additional attenuation to an undesired frequency.

Notch filters can be used with transmitters to reduce or minimize transmitter noise radiation and transmitter intermodulation interference. They can be used with receivers to mitigate receiver desensitization and to mitigate receiver intermodulation interference. Furthermore, a notch filter can reject an undesired frequency that is close to the desired frequency.

Turning to FIG. 2, a system 200 comprising a mobile terminal 210 having two planar inverted-F antennas, in particular, a dual band Code Division Multiple Access (CDMA) antenna 220 and a Global Positioning System (GPS) antenna 230, in close proximity is illustrated in accordance with an aspect of the present invention. Generally, when these two antennas are placed in close proximity of another, coupling between the CDMA antenna 220 and the GPS antenna 230 produces noise from the CDMA antenna 220 to the GPS antenna 230. The noise can desensitize a GPS receiver (not shown). To mitigate the noise from the CDMA antenna 220, a GPS notch filter is included in the dual band CDMA antenna 220, as will be described further in FIG. 3.

Turning now to FIGS. 3 and 4, a dual band CDMA antenna 300 and a GPS antenna 400 are illustrated in accordance with an aspect of the invention. The dual band CDMA antenna 300 can be 800/1900-MHz or 900/1800-MHz, for example, and includes a pattern, which forms a highly-selective notch filter 310. This notch filter 310 acts as a series stub, which creates a rejection filter at the GPS frequency and increases isolation between the GPS 400 and CDMA antennas 300 when placed in close proximity of each other. Although the GPS antenna 400 is placed in close proximity to the CDMA antenna 300, the GPS antenna 400 maintains a distinct feed point. The GPS antenna 400 can be at 1.575 GHz and can have a wavelength in-between the dual band system. In accordance with one particular aspect of the invention, the notch filter pattern 310 is a quarter-wavelength long at GPS, and thus, fits conveniently inside a low band resonator, or a cell resonator 320, of the CDMA antenna 300.

Generally, the notch filter pattern 310 fits into roughly one-third the width of a strip 320 onto which it is etched. If the notch pattern 310 is too wide (e.g., capacitance increases and a quality factor of the resonant circuit decreases), the notch filter will be less selective, thus, interfering with a high band of the dual band CDMA antenna 300. On the other hand, if the notch filter pattern 310 is too narrow (e.g., capacitance decreases and the quality factor of the resonant circuit increases), the notch filter effect will be insignificant.

The GPS antenna 400, illustrated in FIG. 4, can then be placed in close proximity of the dual band CDMA antenna 300 having the notch filter 310 at a desired (e.g., optimal) position on a mobile terminal without interference between the two antennas 300 and 400. The GPS antenna 400 does have a notch filter pattern, as the GPS antenna 400 does not produce noise that will interfere with the dual band antenna 300.

Figure 5:
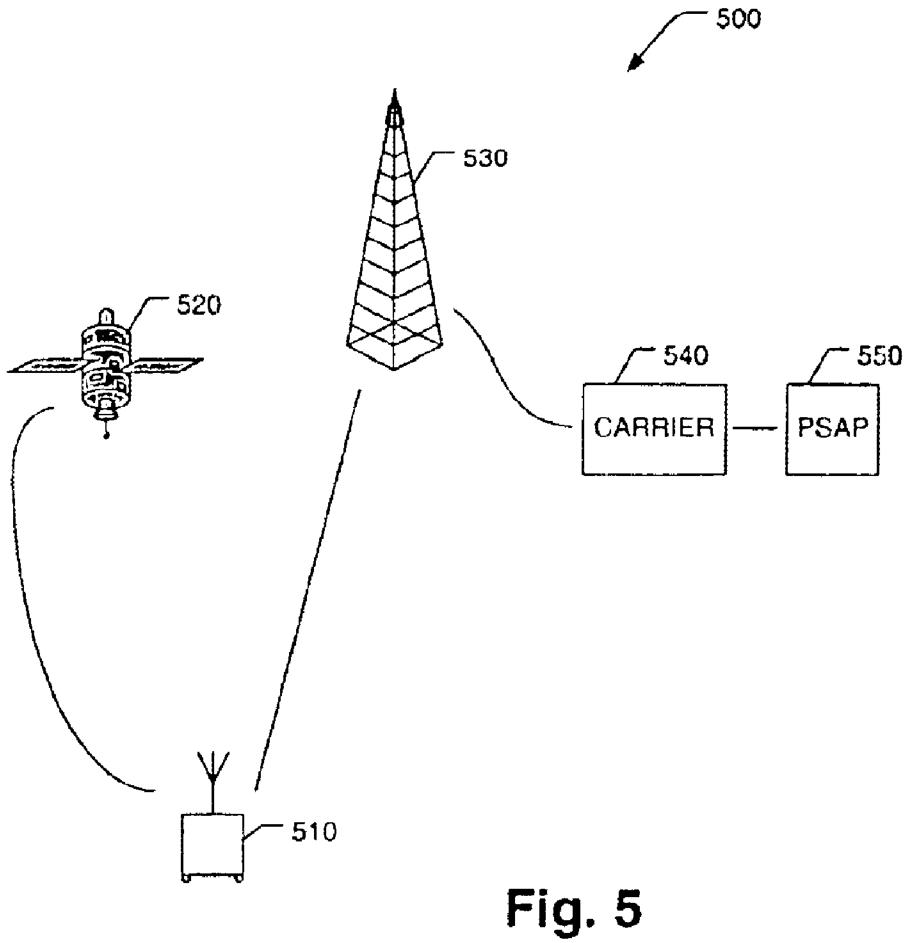
FIG. 5 illustrates a schematic diagram of a mobile terminal employed in an E911 system in accordance with an aspect of the present invention.

FIG. 5 illustrates an E-911 system 500 in accordance with an aspect of the present invention. A mobile terminal 510 is employed having a GPS antenna and a CDMA antenna with a GPS notch filter, the GPS antenna and the CDMA antenna being located in close proximity of each other. Either continuously or when a 911 call is placed, the mobile terminal 510 receives signals from GPS satellites 520 and determines the mobile terminal's latitude and longitude. The voice call and latitude and longitude data are sent to antennas 530, which in turn, forward the voice, latitude, and longitude data to a carrier's 540 switch. The carrier 540 then forwards the voice call and the latitude and longitude to a Public Safety Answering Point (PSAP) 550 for use by a 911 dispatcher.

Figure 6:
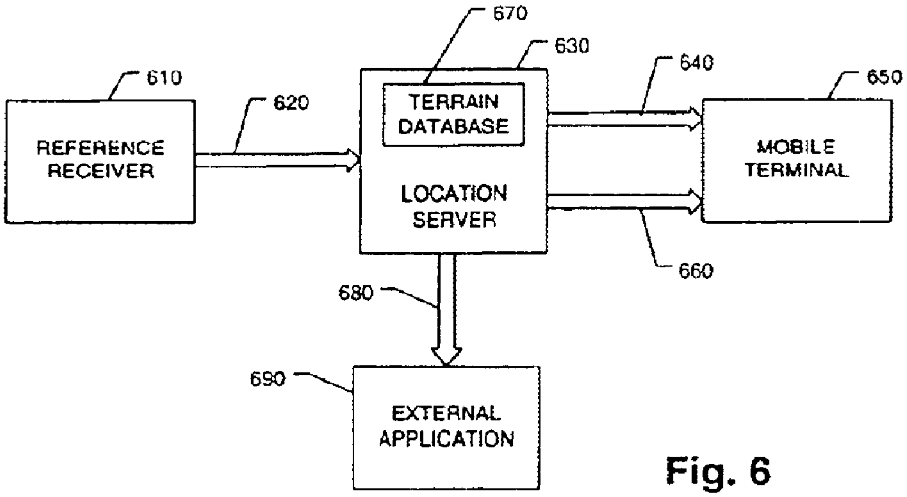
FIG. 6 illustrates a block diagram of an Assisted-GPS technique in accordance with an aspect of the present invention.

Turning now to FIG. 6, an Assisted-GPS (A-GPS) technique 600 is illustrated. A mobile terminal's location determination can be improved upon by employing A-GPS technique 600. The assistance comes from a GPS reference receiver 610 or network of reference receivers, which in turn report gathered navigation messages and differential correction data 620 for GPS satellites in view to a location server 630. The location server 630 then provides aiding data 640 to a mobile terminal 650 on demand (e.g., upon an E-911 call). The aiding data 640 generally includes a list of satellites in view from the mobile terminal 650 and their relative Doppler offsets. (Estimated Doppler can be improved by using a location of a base station communicating with the mobile terminal 650 as an approximate mobile terminal location). This small message (approximately 50 bytes) is all the mobile terminal 650 needs to know from the location server 630 to extract pseudo-range information 660 from its short snapshot of GPS data. The location server 630 can also have access to a terrain elevation database 670, which would allow accurate altitude aiding in the location of a mobile terminal. The terrain elevation 670 provides essentially an extra range measurement, improving reliability and accuracy. The location server 630 is then able to send mobile terminal location information 680 to an external application 690.

Figure 7:
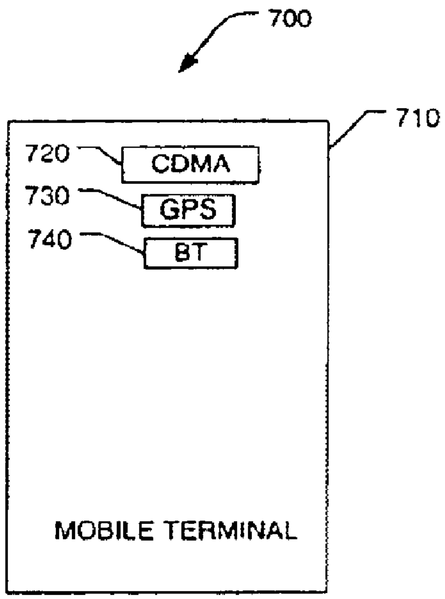
FIG. 7 illustrates a mobile terminal having a CDMA antenna, a GPS antenna, and a Bluetooth antenna in accordance with an aspect of the present invention.

In accordance with another aspect of the invention, FIG. 7 illustrates a system 700 comprising a mobile terminal 710 with a Bluetooth antenna 740 placed in close proximity with a dual band CDMA antenna 720 and a GPS antenna 730. Bluetooth is a computing and telecommunications industry specification that describes how mobile terminals, e.g., phones, computers, and personal digital assistants, can interconnect with each other and with home and business phones and computers using a short-range wireless connection. For example, with Bluetooth, users of mobile terminals will be able to purchase a three-in-one phone that can double as a portable phone at home or in the office, be quickly synchronized with information in a desktop or notebook computer, initiate sending or receiving of a fax, initiate a print-out, and, in general, have substantially all mobile and fixed computer devices coordinated.

Bluetooth provides up to 720 Kbps data transfer within a range of 10 meters and up to 100 meters with a power boost. Unlike IrDA, which requires that devices be aimed at each other (line of sight), Bluetooth employs omnidirectional radio waves that can transmit through walls and other non-metal barriers. Bluetooth transmits in the unlicensed 2.4 GHz band and uses a frequency hopping spread spectrum technique that changes its signal 1600 times per second. However, if there is interference from other devices, the transmission does not stop, but its speed is downgraded.

Having the CDMA antenna 720 and the Bluetooth antenna 740 in close proximity is likely to produce noise or spurs at the Bluetooth frequency band. This can desensitize the Bluetooth receiver, thus degrading the performance of the Bluetooth module. Accordingly, in order to mitigate the interference between the CDMA 720 and the Bluetooth 740 antennas, a Bluetooth notch filter is placed in the CDMA antenna 720. Furthermore, coupling between the CDMA antenna 720 and the GPS antenna 730 produces noise from the CDMA antenna 720 into the GPS antenna 730, which desensitizes the GPS receiver. To mitigate the noise from the CDMA antenna 720, a GPS notch filter is included in the dual band CDMA antenna 720, in addition to the Bluetooth notch filter.

Figure 8:
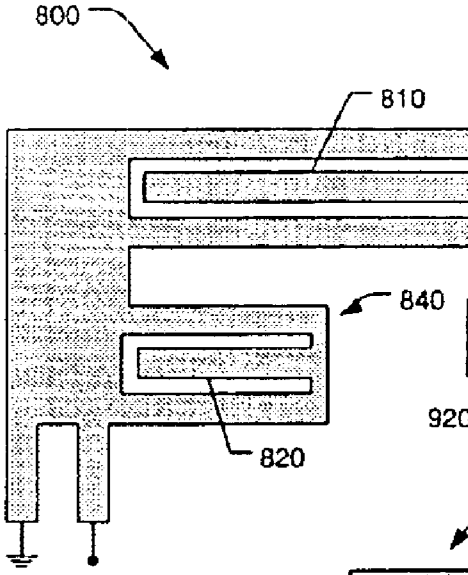
FIG. 8 illustrates a CDMA antenna in accordance with an aspect of the present invention.
Figure 9:
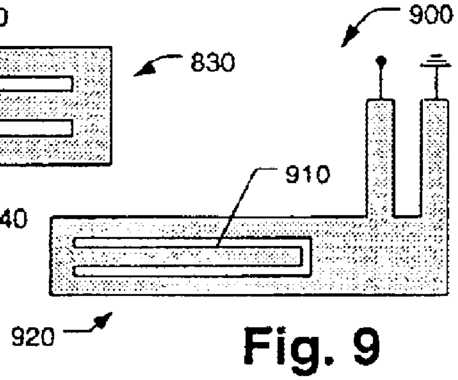
FIG. 9 illustrates a GPS antenna in accordance with an aspect of the present invention.
Figure 10:
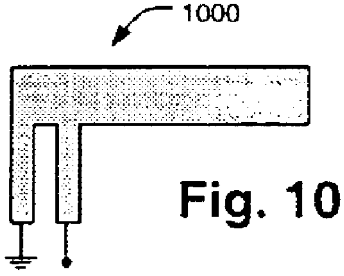
FIG. 10 illustrates a Bluetooth antenna in accordance with an aspect of the present invention.

Turning now to FIGS. 8–10, a dual band CDMA antenna 800, a GPS antenna 900, and a Bluetooth antenna 1000 are illustrated. The CDMA antenna 800 includes two notch filters: a GPS notch filter 810 and a Bluetooth notch filter 820. The GPS notch filter pattern 810 is a quarter-wavelength long at GPS, and thus, fits inside a cell resonator portion 830 of the CDMA antenna 800. Accordingly, the Bluetooth notch filter 820 can be placed in a PCS resonator portion 840 of the CDMA antenna 800. The Bluetooth notch 820 facilitates isolation between the Bluetooth 1000 and CDMA 800 antennas when the antennas 800 and 1000 are placed in close proximity of each other. Similarly, the GPS notch 810 facilitates isolation between the GPS antenna 900 and the dual band CDMA antenna 800 when placed in close proximity of another.

The Bluetooth module 740 of the mobile terminal 710 might also generate noise or spurs at the GPS frequency band. This may desensitize the GPS receiver, thus degrading the performance of the GPS module 730. Although the Bluetooth module 740 is unlikely to create as much interference as the CDMA module 720, the Bluetooth module 740 transmission may, nevertheless, noticeably degrade the GPS performance. Therefore, as illustrated in FIG. 9, there can also be a Bluetooth notch filter 910 in the GPS antenna 900 to increase the isolation between the Bluetooth and GPS antennas. However, a user may find that the Bluetooth notch 910 in the GPS antenna 900 is unnecessary thus, may opt to not include the notch 910.

Generally, the notch filter patterns 810, 820, and 910 fit into roughly one-third the width of the strips 830, 840, and 920, respectively, onto which they are etched. If the notch patterns 810, 820, and 910 are too wide (e.g., capacitance increases and the quality factor of the resonant circuit decreases), the notch filters will be less selective, thus, interfering with the high band of the dual band antenna 800. On the other hand, if the notch filter patterns 810, 820, and 910 are too narrow (e.g., capacitance decreases and the quality factor of the resonant circuit increases), the notch filters' effect will be insignificant.

The Bluetooth antenna 1000, illustrated in FIG. 10, can then be placed in close proximity of the dual band CDMA antenna 800 having notch filters 810 and 820 and the GPS antenna 900 at an optimal position on a mobile terminal without interference between the three antennas 800, 900, and 1000. The Bluetooth antenna 1000 does have a notch filter pattern, as the Bluetooth antenna 1000 does not produce noise that will interfere with the dual band CDMA antenna 800 or the GPS antenna 900.

Figure 11:
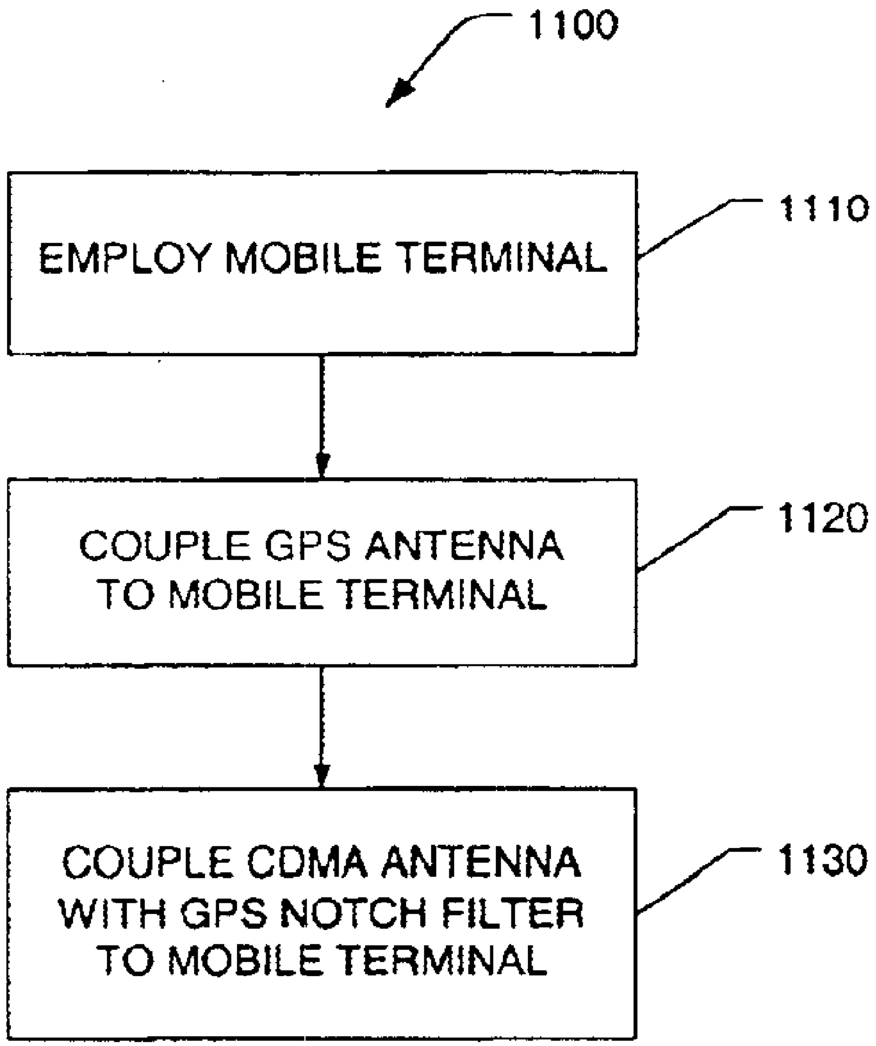
FIG. 11 illustrates a methodology for fabricating a mobile terminal having a CDMA antenna and a GPS antenna in accordance with an aspect of the present invention.
Figure 12:
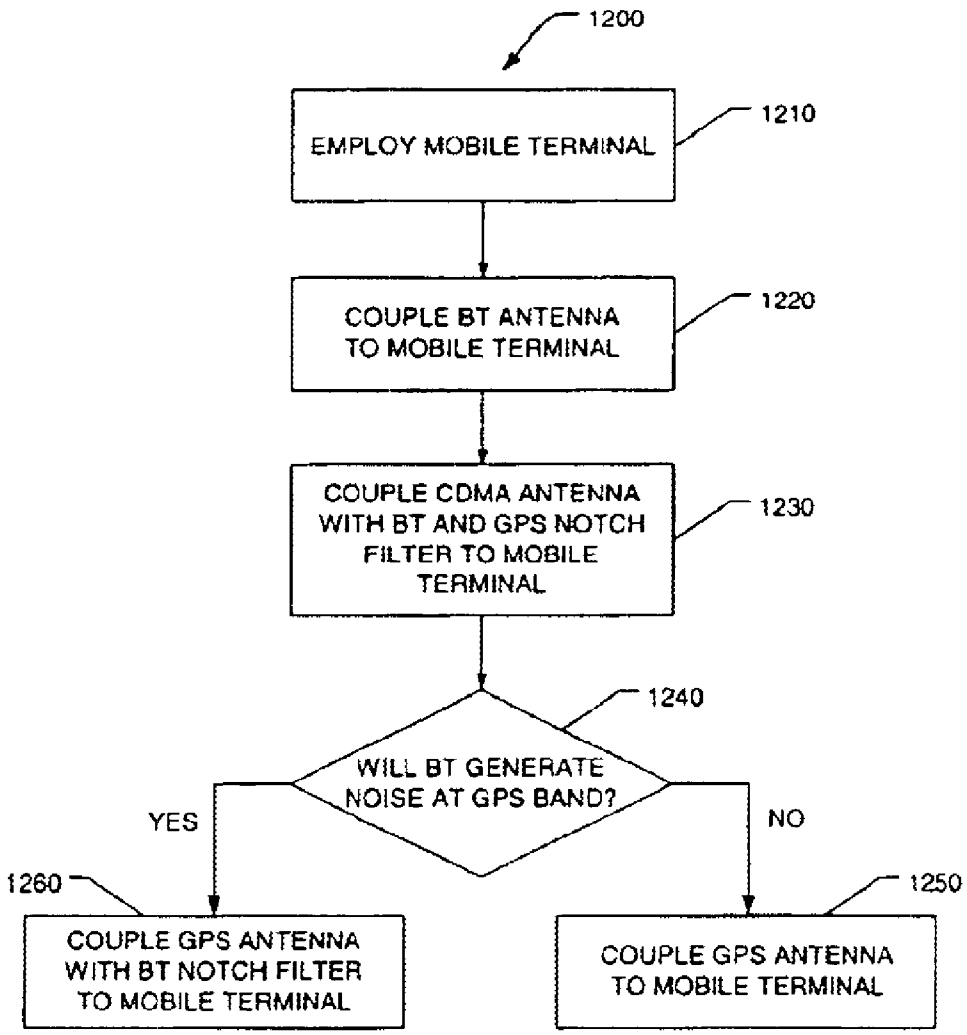
FIG. 12 illustrates a methodology for fabricating a mobile terminal having a CDMA antenna, a GPS antenna, and a Bluetooth antenna in accordance with an aspect of the present invention.
Figure 13:
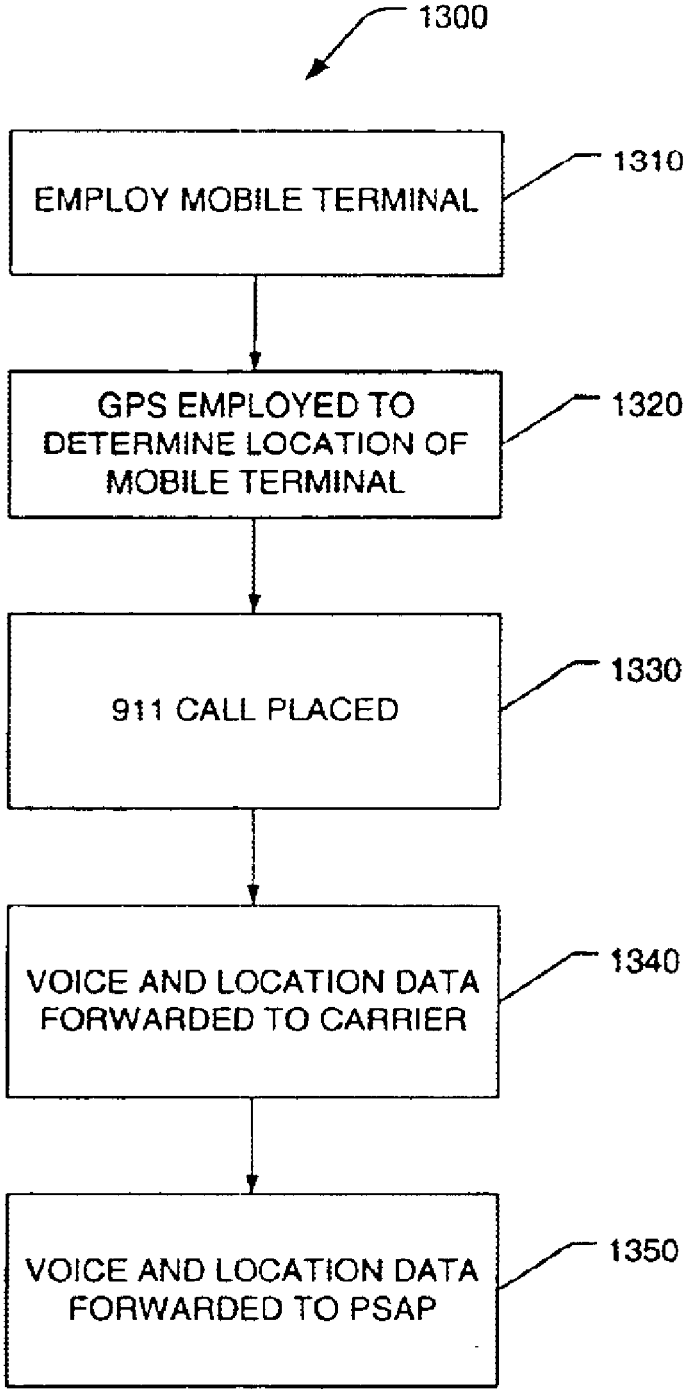
FIG. 13 illustrates a methodology for employing a mobile terminal having a CDMA antenna and a GPS antenna in an E911 system in accordance with an aspect of the present invention.

In view of the foregoing structural and functional features described above, methodologies in accordance with various aspects of the present invention will be better appreciated with reference to FIGS. 11–13. While, for purposes of simplicity of explanation, the methodologies of FIGS. 11–13 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 11 illustrates a methodology 1100 for placing a CDMA antenna and a GPS antenna in close proximity on a mobile terminal. The methodology begins at 1110 where a mobile terminal is employed. Then, at 1120, a GPS antenna, is coupled to the mobile terminal. At 1130, a dual band CDMA antenna having a GPS notch filter is coupled to the mobile terminal in close proximity to the GPS antenna. Thus, both the GPS and CDMA antennas are placed in a desired position within the mobile terminal.

FIG. 12 illustrates a methodology 1200 for placing a CDMA antenna, a GPS antenna, and a Bluetooth antenna in close proximity on a mobile terminal. The methodology begins at 1210 where a mobile terminal is employed. At 1220, a Bluetooth antenna is coupled to the mobile terminal. Then, at 1230, a dual band CDMA antenna is coupled to the mobile terminal and placed within close proximity of the Bluetooth antenna. The CDMA antenna includes a Bluetooth notch filter and a GPS notch filter to mitigate interference between the three antennas. At 1240, a determination is made as to whether the Bluetooth antenna will generate noise at the GPS band frequency. If the determination is no, the method proceeds to 1250 where a GPS antenna is coupled to the mobile terminal and placed within close proximity of the CDMA and Bluetooth antennas. If, at 1240, the determination is yes, the method proceeds to 1260 where a GPS antenna with a Bluetooth notch filter is coupled to the mobile terminal and placed in close proximity of the CDMA and Bluetooth antennas. The Bluetooth notch filter mitigates the noise generated at the GPS band frequency.

At FIG. 13 a methodology 1300 for determining a location of a mobile terminal in an E-911 situation is illustrated in accordance with an aspect of the present invention. At 1310, a mobile terminal is employed having a dual band CDMA antenna and a GPS antenna located in close proximity of each other at an optimal position on the mobile terminal. The CDMA antenna has a GPS notch filter to mitigate any interference produced by the CDMA antenna in the GPS frequency band. At 1320, the mobile terminal receives signals from a GPS satellite and determines the location of the mobile terminal. Then, at 1330, the mobile terminal places a 911 call, thus transmitting voice data and location data to an antenna. The antenna forwards the voice and location data to a carrier's switch at 1340. Then, at 1350, the carrier forwards the voice and location data to a Public Safety Answering Point (PSAP).

It is to be appreciated that the antennas and methodologies of the subject invention as described herein have wide applicability. The PIFAs or IFAs of the subject invention, having notch filters placed therein, can be employed for example in numerous types of commercial and industrial electronic devices (e.g., cellular telephones, computers, personal data assistants, cameras, toys, electronic games . . . ). Moreover, the methodologies of the subject invention can be employed in connection with processes associated with fabricating antennas related to such devices.

While FIGS. 2–13 have been described herein with reference to a dual-band CDMA antenna, it is to be appreciated that other antennas, such as a dual band GSM antenna, may also be used and is contemplated as falling within the scope of the invention. Furthermore, it is also to be appreciated that any reference made to a PIFA herein is also applicable to an IFA. The exaggerated size of the antennas herein, is shown for illustration purposes only and one skilled in the art could readily determine appropriate sizes for the PIFA or IFA antennas for carrying out the subject invention with respect to mobile terminal applications.

Figure 14:
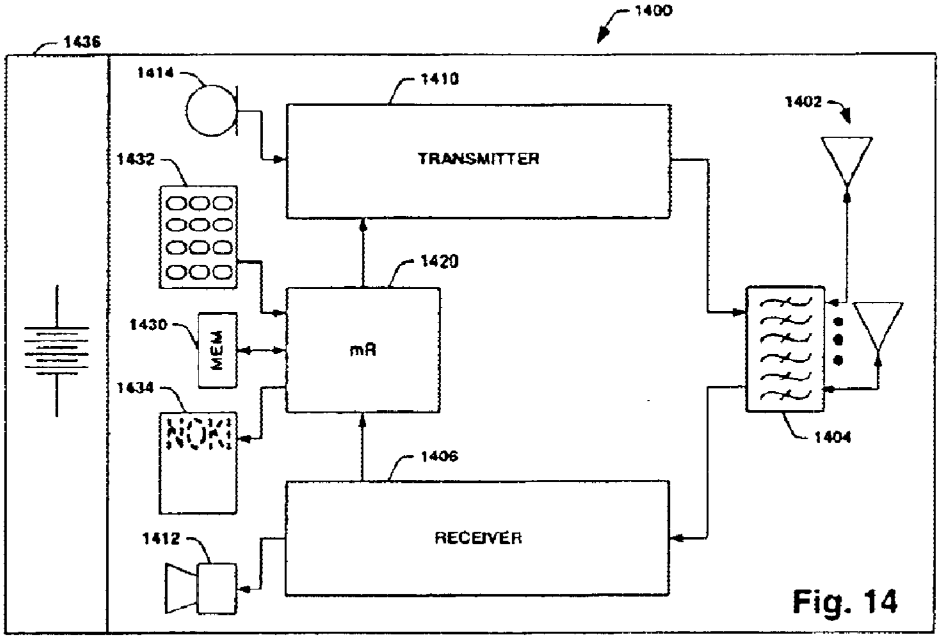
FIG. 14 illustrates a communication device which can be employed within a wireless communications system in accordance with an aspect of the present invention.

FIG. 14 illustrates an exemplary communications device 1400 (e.g., mobile station, base station) which can be employed as a wireless communications system in accordance with the subject invention. The illustrated communications device 1400 comprises a plurality of internal antennas 1402 and a connected duplex filter 1404, where reception-frequency signals received by the antennas 1402 are directed to a receiver 1406, and the signal from a transmitter 1410 is directed to the antennas 1402. The receiver 1406 provides reception, downmixing, demodulation and decoding functions by which a received radio-frequency signal is converted to an analog audio signal, which is then directed to a speaker 1412, and to data signals which are directed to a processor 1420. The transmitter 1410 comprises usual coding, interleaving, modulation and upmixing functions whereby the analog audio signal produced by the microphone 1414 and the data signals received by the processor 1420 are converted to a transmittable radio-frequency signal. In addition, the communication device 1400 comprises a memory 1430, a keyboard 1432, a display 1434 and a power source 1436. The receiver as described herein provides for mitigating of ICI especially with respect to high-order modulation application. The processor 1420 executes necessary algorithms and also in other ways controls operation of the communications device 1400, at least in part under directions of program(s) recorded in the memory 1430, and commands input via a user and system commands (e.g., transmitted via a base station).

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mobile terminal, comprising:

a housing;

a plurality of antennas located within the housing, at least one of the plurality of antennas being an inverted-F antenna, the plurality of antennas, being located in close proximity of each other; and a notch filter located in the inverted-F antenna.

2. The mobile terminal of claim 1, the plurality of antennas being planar inverted-F antennas.

3. The mobile terminal of claim 1, the plurality of antennas being inverted-F antennas.

4. The mobile terminal of claim 1, the plurality of antennas comprising a dual band Code Division Multiple Access (CDMA) antenna and a Global Positioning System (GPS) antenna.

5. The mobile terminal of claim 4, the plurality of antennas further comprising a Bluetooth antenna.

6. The mobile terminal of claim 5, the CDMA antenna having a GPS notch filter and a Bluetooth notch filter.

7. The mobile terminal of claim 5, the GPS antenna having a Bluetooth notch filter.

8. The mobile terminal of claim 4, the CDMA antenna having a GPS notch filter.

9. The mobile terminal of claim 1 being a wireless telephone.

10. The mobile terminal of claim 1 being a portable computing device.

11. The mobile terminal of claim 1, the notch filter being an open-circuit or a short circuit.

12. A mobile terminal, comprising:

a housing; and a dual band antenna and a Global Positioning System (GPS) antenna located within the housing in close proximity of each other, the dual band antenna being an inverted-F antenna, the dual band antenna having a notch filter therein.

13. The mobile terminal of claim 12, the dual band antenna being a Code Division Multiple Access (CDMA) antenna.

14. The mobile terminal of claim 12, the dual band antenna being a Global System for Mobile Communications (GSM) antenna.

15. The mobile terminal of claim 12, the mobile terminal transmitting voice and location data to a Public Safety Answering Point (PSAP) upon placing a 911 call.

16. The mobile terminal of claim 12, the mobile terminal being employed in an Assisted-GPS (A-GPS) technique.

17. A method for placing a plurality of antennas in close proximity on a mobile terminal, comprising:

placing a plurality of inverted-F antennas at an optimal position on a mobile terminal, at least one of the plurality of antennas having a notch filter to mitigate interference between the antennas.

18. The method of claim 17, the plurality of antennas comprising a dual band Code Division Multiple Access (CDMA) antenna and a Global Positioning System (GPS) antenna.

19. The method of claim 18, the plurality of antennas further comprising a Bluetooth antenna.

20. The method of claim 19, the dual band CDMA antenna having a GPS notch filter and a Bluetooth notch filter to facilitate isolation between the dual band CDMA antenna, the GPS antenna, and the Bluetooth antenna.

21. The method of claim 19, the GPS antenna having a Bluetooth notch filter to facilitate isolation between the GPS antenna and the Bluetooth antenna.

22. The method of claim 18, the dual band CDMA antenna having a GPS notch filter to facilitate isolation between the dual band CDMA antenna and the GPS antenna.

23. A method for determining a location of a mobile terminal, comprising:

employing a mobile terminal, the mobile terminal having a plurality of inverted-F antennas located in close proximity of each other, at least one of the plurality of inverted-F antennas having a notch filter to mitigate interference between the plurality of inverted-F antennas;

determining location data for the mobile terminal from Global Positioning System (GPS) signals;

placing a 911 call from the mobile terminal; and transmitting voice and location data from the mobile terminal to a 911 dispatcher.

24. The method of claim 23, the plurality of inverted-F antennas being a dual band Code Division Multiple Access (CDMA) antenna and a GPS antenna.

25. The method of claim 23, further comprising, employing a GPS reference receiver to gather navigation messages and differential correction data for GPS satellites and to transmit the messages and data to a location server.

26. The method of claim 25, the location server providing aiding data to the mobile terminal on demand.

27. The method of claim 25, the location server having access to a terrain elevation database, the terrain elevation database providing extra range measurement.

* * * * *